Oct. 31, 1950   H. H. YOUNG ET AL   2,528,482
RECOVERY OF STEROLS FROM WOOL FAT
Filed May 8, 1947
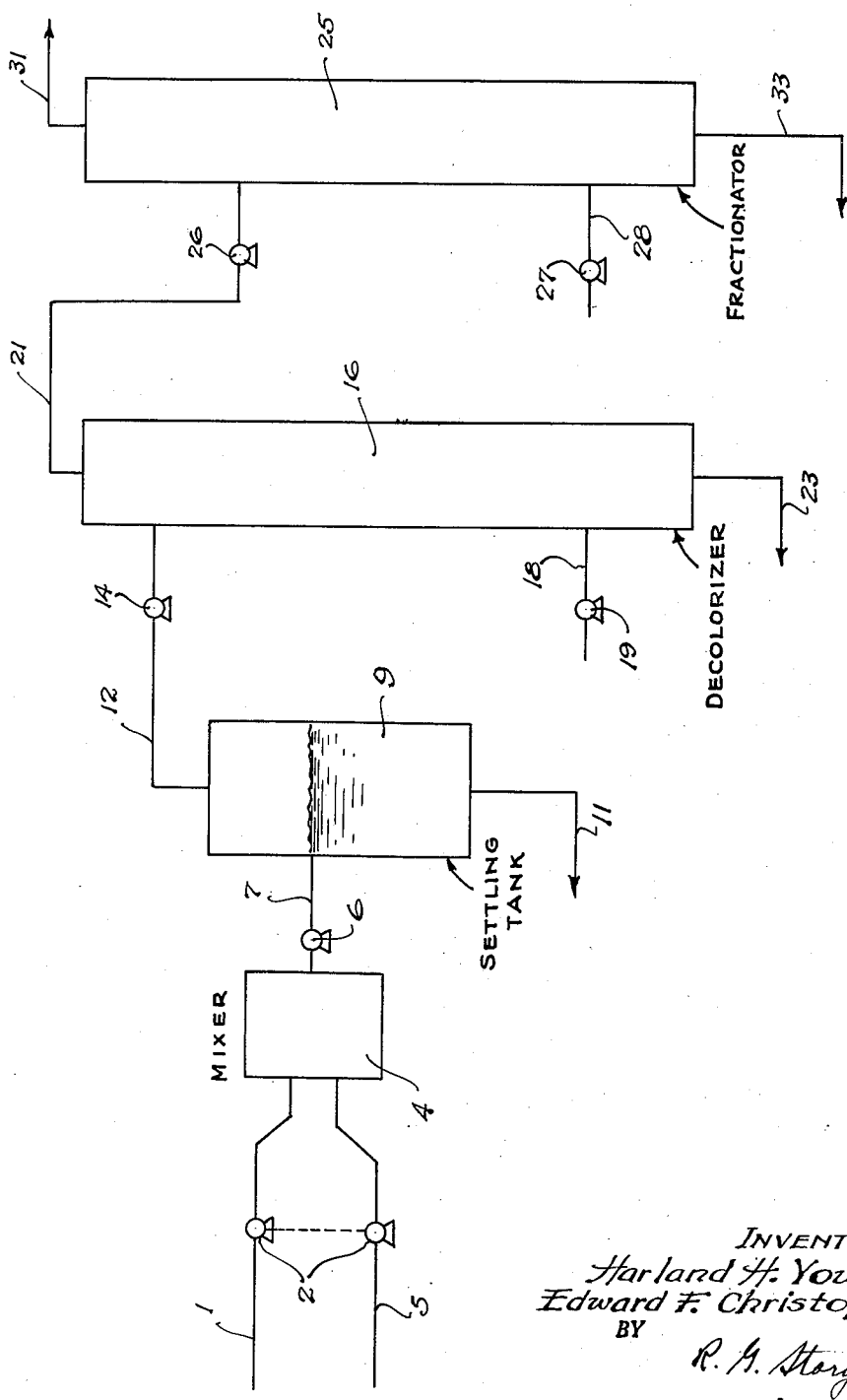
INVENTORS
Harland H. Young
Edward F. Christopher
BY
R. H. Story
ATTORNEY Patented Oct. 31, 1950

2,528,482

UNITED STATES PATENT OFFICE 2,528,482

RECOVERY OF STEROLS FROM WOOL FAT

Harland H. Young and Edward F. Christopher, Chicago, Ill., assignors to Swift & Company, Chicago, Ill., a corporation of Illinois Application May 8, 1947, Serial No. 746,730

3 Claims. (Cl. 260—397.2)

This invention relates to an improved process for refining wool fat. More particularly it has to do with a process for bleaching and separating crude wool fat into its various components. The invention is especially applicable to the separation of the sterols and sterol esters present in naturally occurring wool fat.

Wool fat is recovered from the wash water obtained from the scouring of wool. The process heretofore employed for the recovery of wool fat from wool scouring waters involves acidulation of the wash waters with a strong acid, such as dilute sulfuric acid, to decompose the soap used in the scouring treatment, and then the separation by centrifugation of the wool grease and fatty acids from the dirt and inorganic matter suspended in the wash waters. The resulting crude wool fat usually contains about 50 per cent of water emulsified with the grease and the fatty acids, and has very little commercial utility until it is purified. The process of purification comprises the steps of caustic refining to neutralize the free fatty acids, bleaching and deodorization. Because of the highly viscous nature of wool fat, filtering thereof after bleaching is often troublesome and requires special operating techniques. Pure wool grease is known in the trade as "refined wool grease"; emulsified with 1 to 3 parts of water, it is sold as lanolin.

An object of the invention is to provide an efficient, simple process of purifying crude wool grease.

Another object of the invention is to provide an improved method of bleaching crude wool grease.

A further object of the invention is to provide a method of separating the valuable sterols and sterol esters contained in crude wool fat from the waxes and glycerides present in wool grease.

The invention contemplates treating crude wool grease with a liquefied normally gaseous hydrocarbon solution under such conditions of temperature and pressure that a separation of a small bottom dark phase and a larger top decolorized phase is effected. Further separation or fractionation of the decolorized phase may be carried out by altering the conditions of temperature, pressure and solvent ratio.

In accordance with the invention, wool scouring liquids are preliminarily treated to precipitate the soluble soaps and any free fatty acids contained in the scouring water. By treating the said waters with a base material, such as an alkaline earth or bivalent metal, hydroxide, for example slaked lime, the soluble soaps and the free fatty acids in the waters are precipitated and the wool grease coagulated. An emulsion forms, which rises to the top of the treated waters as a scum. The scum is skimmed off and is extracted with a liquefied normally gaseous solvent, such as propane. The propane solution is then subjected to such temperature and pressure conditions as to effect a plurality of phases containing materials present in crude wool grease, exhibiting different degrees of solubility in liquified propane. Obviously, we may also employ the crude wool fat obtained by prior art practice of recovering wool fat from the scouring waters by acidulation, centrifugation, and neutralization, as hereinabove described.

More particularly it is contemplated to treat wool scouring waters to recover the crude wool fatty material therefrom, including sterols, sterol esters, triglycerides, and straight chain alcohol esters, or wax esters. The solution of these materials in liquefied propane is charged to a fractionating tower operated under such conditions of temperature, pressure and solvent to crude wool grease ratio such that the propane dissolves the fatty material but throws out of solution those materials, or color bodies, responsible for imparting the color to the crude wool grease. The solution of propane and fatty material is then charged to a second fractionating tower. More solvent is simultaneously introduced into the tower, and the temperatures and pressures increased. Increasing the operating conditions of temperature and pressure in the tower decreases the solvent action of the propane, so that a plurality of phases is formed. The top phase contains the more soluble fraction of the wool grease or the sterols and esters thereof, while the bottom fraction, in a smaller proportion of solvent, is rich in triglycerides, and uncombined straight chain alcohols, and wax esters present in the original wool grease.

Our invention will be more fully understood from the following description thereof given in connection with the drawing.

In the drawing, the limed precipitate obtained from the wash waters resulting from the scouring of wool, not shown, is pumped through line 1 by means of proportioning pump 2 into mixing zone 4. Simultaneously with the introduction of the precipitate into mixing zone 4, liquefied propane is introduced therein by means of proportioning pump 2 through line 5. Sufficient propane is employed to dissolve the sterols, glycerides, esters and alcohols present in the wash water scum. For example, about 5 volumes of liquefied propane to 1 volume of charged crude material at a temperature of about 120° F. and a pressure of about 250 pounds per square inch to maintain the solvent in the liquid state is suitable for most purposes. After the mixing operation in mixing tank 4 is complete, the mixture is introduced by pump 6 and through line 7 into settling zone, or tank, 9. In this tank, propane-insoluble materials, such as lime, soap, dirt, inorganic salts, and other impurities, settle to the bottom of tank 9 and are withdrawn therefrom through line 11. The solution of fatty material and propane, having a low specific gravity, rises to the top of the settling tank and is withdrawn therefrom through line 12 by means of pump 11 and introduced into fractionating tower, or decolorizer, 16. Additional liquefied propane solvent is introduced into decolorizer 16 through line 18 by means of pump 19 at a point in the lower section of the tower. Operating conditions in tower 16 are such as to effect decolorization of the fatty material. That is, the tower is operated in such manner as to cause the propane to selectively dissolve the desired fatty material in one phase while leaving the undesirable color bodies out of solution in another phase, which is discarded. We have found, for example, that a satisfactory decolorization of crude wool grease may be obtained by employing a ratio of solvent to fatty material of 15 to 1, and operating the tower at a temperature of about 160° F. to 170° F. and at a pressure of about 550 to 600 pounds per square inch.

Following the decolorizing operation in tower 16, the heavier phase, including oxidized fatty material, color bodies, and other impurities, and a small proportion of solvent, is withdrawn from the tower through line 23 and conducted to a solvent recovery unit, not shown. Simultaneously with the removal of the bottom phase, the overhead light colored phase in substantially all of the solvent is withdrawn from tower 16 through line 21 by means of pump 26. The decolorized fatty material solution is charged to a second fractionating tower 25. Additional propane is introduced into the lower half of tower 25 through line 28 by means of pump 27, simultaneously with the introduction of the fatty material charged to the tower through line 21. Fractionating tower 25 is operated at higher temperatures, pressures and solvent ratios than are employed in the decolorizer, whereby to effect the further separation of the charged fatty material into fractions. For example, by increasing the solvent ratio from about 15 to 30 to 50 volumes of solvent to 1 of fatty material and raising the temperature from about 190° F. to 200° F. under a pressure of 600 to 700 pounds per square inch, two phases are formed, a top lighter phase containing the more soluble sterols and esters thereof, and a bottom heavier phase rich in glycerides and wax esters. The lighter, or overhead, phase is withdrawn from fractionator 25 through line 31 and conducted to solvent recovery unit, not shown, while the bottom fraction is also taken to a solvent recovery unit, not shown.

We have found that decolorization of crude wool grease may be effected by employing an amount of solvent in a ratio ranging from about 10 to 20 of solvent to 1 of oil by volume. Temperature conditions in the decolorizer may range from about 155° F. to 170° F., with corresponding pressures of about 400 to 475 pounds per square inch absolute to keep the solvent in the liquid state. For most purposes, a temperature of about 160° F. and a pressure of about 425 pounds per square inch absolute, with a solvent to oil ratio of about 15 to 1, have been found to be satisfactory. Under these conditions, about 3 to 5 per cent of the charged fatty material is obtained as a bottom fraction.

In the second tower, or fractionator, operating conditions are such as to effect a separation into phases of the sterols, such as cholesterol and isocholesterol and the esters thereof, from the glycerides and straight chain alcohols, such as cetyl and carnaubyl alcohol, and the esters thereof. The sterols and the sterol esters are more soluble in propane than the straight chain alcohols, the wax esters, and the glycerides, and appear therefore in the top phase in a greater proportion of the solvent. We have found that a top phase containing about 20 to 25 per cent of the fatty material charged to the fractionator represents an efficient separation in most cases. In order to accomplish such a separation, we have found that temperatures of about 185° F. to about 200° F., with pressure ranging from about 600 to 650 pounds per square inch and a solvent ratio of about 25 to 50 volumes of propane to 1 volume of charged fatty material, are satisfactory. In operating at the higher temperatures, a solvent to fatty material ratio of 100 to 1 may be employed; it is preferred, however, to employ a ratio of about 35 to 1, with a temperature of about 190° F. to 200° F. and a corresponding pressure of 625 to 650 pounds per square inch.

Although propane is the preferred solvent, we may employ other normally gaseous hydrocarbons, for example, ethane, propylene, isobutane, and butylene, or combinations thereof.

As an example of the invention, washwater from the scouring of domestic wool was treated with slaked lime to precipitate the soluble soaps and free fatty acids. The liming operation caused the coagulation of crude wool grease, which, together with the precipitated soaps, floated on the surface of the water as a scum containing about 50 per cent moisture, dirt and other impurities. The scum emulsion was skimmed off the treated waters and was pumped into a mixing tank, wherein it was mixed with about 5 volumes of liquefied propane at a temperature of about 125° F. and a pressure of about 250 pounds per square inch. After mixing of the propane and crude fatty material, the resulting mixture was introduced into a vertical settling tank. A rapid separation of crude wool grease in propane from soap, moisture, and other propane-insoluble impurities was obtained. The propane solution, being of light specific gravity, was removed continuously from the top of the settling tank and charged to the upper portion of a packed tower while a stream of propane was simultaneously introduced into the lower portion of the tower. The overall propane ratio was maintained at about 15 volumes of propane to 1 of fatty material and the temperature maintained at 165° F. in the lower portion of the tower and increased uniformly throughout the length of the tower so that the overhead take-off temperature was 169° F. Pressures were maintained at about 50 pounds in excess of the vapor pressure of propane at the highest operating temperature, or at about 525 to 550 pounds per square inch. A heavy phase separated to the bottom of the tower which contained a small amount of solvent and the dark colored impurities of the fat. After removing the solvent from this lower phase, the residue amounted to about 3.5 per cent of the charged fat, was black in color, and highly odoriferous. The overhead phase containing substantially all of the solvent and the remainder of the fatty material was continuously introduced into the upper section of a second packed column and additional propane introduced into the lower portion of this fractionation column. An overall ratio of 35 volumes of propane to 1 of fat was employed. The temperature in the lower portion of the fractionating tower was maintained at about 192° F., and the take-off temperature at about 200° F. This temperature gradient between bottom and top of the fractionator caused a continuous refluxing of a small portion of the fatty material introduced into the column since the solubility of the fat and fat-soluble substance in propane decreases with a rise in temperature, and thereby rendered the separation more efficient. Operating pressures were maintained between about 625 and 650 pounds per square inch. Under the foregoing operating conditions of temperature, pressure and solvent ratio, an overhead fraction containing about 22 per cent of the fatty material charged to the fractionator was obtained. This fraction contained the sterols and the sterol esters, particularly cholesterol, isocholesterol, and the esters thereof. The lower phase material contained essentially uncombined straight chain alcohols, the esters thereof, and the glycerides.

Obviously, many modifications and variations of the invention, as hereinbefore set forth, may be made without departing from the spirit and scope thereof, and therefore only such limitations should be imposed as are indicated in the appended claims.

We claim:

1. A process of treating crude wool fat containing a substantial amount of sterols and sterol esters obtained from wool scouring waters to produce a fraction rich in sterols and sterol esters, which comprises subjecting the crude wool fat to a two-stage liquid phase solvent treatment in the presence of a liquefied normally gaseous hydrocarbon solvent, maintaining conditions of temperature within the range of about 160° F. to 170° F. and pressure within the range of about 550 to 600 pounds per square inch in the first stage whereby color bodies are separated and the wool fat is substantially decolorized, maintaining conditions of temperature within the range of about 190° F. to 200° F. and pressure within the range of about 600 to 700 pounds per square inch in the second stage whereby a fraction relatively rich in the sterols and sterol esters is separated from the decolorized product, and recovering said fraction rich in sterols and sterol esters from said second stage.

2. A process for the recovery of sterols and sterol esters contained in crude fatty material obtained from wool scouring waters, which comprises subjecting the said fatty material to a decolorizing operation in the presence of a liquefied normally gaseous hydrocarbon solvent at temperatures ranging from about 160° F. to 170° F. and pressures within the range of from about 550 to 600 pounds per square inch such that the color bodies separate as a liquid phase, separating said liquid phase from the decolorized fatty material, subjecting said decolorized fatty material to a fractionating operation under conditions of temperature within the range of about 190° F. to 200° F. and pressure within the range of from about 600 to 700 pounds per square inch such that a fraction relatively rich in said sterols and sterol esters separates as a liquid phase from a heavier phase containing the major portion of the fatty material, and separating the phases.

3. A process for the recovery of sterols and sterol esters contained in the wool fatty material obtained from wool scouring waters which comprises subjecting the said fatty material to a decolorizing operation in the presence of liquefied propane solvent at temperatures of from about 160° F. to 170° F. and pressures of from about 550 to 600 pounds per square inch such that the color bodies separate as a liquid phase, separating said liquid phase from the decolorized fatty material containing the sterols and sterol esters, subjecting said decolorized fatty material to a fractionating operation in the presence of additional said solvent, increasing the temperature and pressure in said operation to within a range of from about 190° F. to 200° F. and from about 600 to 700 pounds per square inch, respectively, such that two phases are formed, one of said phases being relatively rich in sterols and sterol esters and the other of said phases being relatively rich in fatty material, and separating said phase rich in sterols and sterol esters.

HARLAND H. YOUNG.
EDWARD F. CHRISTOPHER.

REFERENCES CITED

The following references are of record in the file of this patent:

UNITED STATES PATENTS

| Number | Name | Date |
|---|---|---|
| 1,328,047 | Jones | Jan. 13, 1920 |
| 2,280,843 | Oliver | Apr. 28, 1942 |

FOREIGN PATENTS

| Number | Country | Date |
|---|---|---|
| 485,198 | Germany | Dec. 25, 1926 |

OTHER REFERENCES

Hartmann, Chimi et Industrie 8, 635 (1922).
Vodsinkaya, Chem. Zentr., 1940, II, pages 2556–2557.